(12) United States Patent
Ruda et al.

(10) Patent No.: US 7,152,977 B2
(45) Date of Patent: Dec. 26, 2006

(54) SOLID STATE LIGHT ENGINE OPTICAL SYSTEM

(75) Inventors: Mitchell C. Ruda, Tucson, AZ (US); Tilman W. Stuhlinger, Tucson, AZ (US); Kevin J. Garcia, Tucson, AZ (US)

(73) Assignee: Qubic Light Corporation, Sausalito, CA (US)

( * ) Notice: Subject to any disclaimer, the term of this patent is extended or adjusted under 35 U.S.C. 154(b) by 143 days.

(21) Appl. No.: 10/713,919

(22) Filed: Apr. 24, 2003

(65) Prior Publication Data

US 2005/0036119 A1 Feb. 17, 2005

(51) Int. Cl.
*G03B 21/26* (2006.01)
*G03B 21/28* (2006.01)

(52) U.S. Cl. .......................... 353/37; 353/98; 362/297

(58) Field of Classification Search ................. 353/69, 353/79, 85, 122, 37, 98, 84; 362/296–297
See application file for complete search history.

(56) References Cited

U.S. PATENT DOCUMENTS

| | | | | |
|---|---|---|---|---|
| 4,912,614 A | * | 3/1990 | Goldenberg | ................. 362/347 |
| 5,704,700 A | * | 1/1998 | Kappel et al. | ................. 353/31 |
| 5,997,150 A | * | 12/1999 | Anderson | ................. 362/227 |
| 6,079,834 A | * | 6/2000 | McCoy | ........................ 353/110 |
| 6,154,259 A | * | 11/2000 | Hargis et al. | ................. 353/69 |
| 6,195,136 B1 | * | 2/2001 | Handschy et al. | ............. 349/5 |
| 6,612,701 B1 | * | 9/2003 | Westort et al. | ................. 353/10 |
| 2003/0090632 A1 | * | 5/2003 | Kim et al. | ..................... 353/31 |
| 2004/0075817 A1 | * | 4/2004 | Agostinelli et al. | ........... 353/34 |
| 2004/0264185 A1 | * | 12/2004 | Grotsch et al. | ............. 362/231 |

* cited by examiner

*Primary Examiner*—Christopher Mahoney
(74) *Attorney, Agent, or Firm*—Koda & Androlia

(57) ABSTRACT

An optical system for use in projection based displays includes a plurality of solid state light sources associated with a plurality of total internal reflection based compound hyperbolic emitters, a graduated dichroic filter based device for homogenizing light output from the plurality of solid state light sources, a ferro-electric liquid crystal on silicon device for illumination with light output from the array of solid state light sources, and a polarization diffuser for homogenization of light at the ferro-electric liquid crystal on silicon device, wherein the polarization diffuser is positioned at a point in space, in the optical system, where the size of a beam of light transmitted from the graduated dichroic filter based device is substantially at a maximum.

22 Claims, 9 Drawing Sheets

● - HW or SW Adjustment (Used to adjust constant current going to LED ARRAY for color balance)

SOLID STATE LIGHT ENGINE OPTICAL SYSTEM

CROSS-REFERENCE TO RELATED APPLICATIONS

The contents of this application are related to U.S. Provisional Application Ser. No. 60/465,732 (filed Apr. 24, 2003), entitled "Personal Theater Optical System" the contents of which are incorporated herein by reference in their entirety.

BACKGROUND

1. Field of the Invention

The present invention relates to light and image projectors and particularly to illumination devices for projection displays.

2. Description of the Background Art

The prior art discloses various light sources and image projectors for viewing videos and images. The simplest light projector comprises a flashlight and a more complex device comprises an image projector with an incandescent light source such as in U.S. Pat. No. 6,227,669.

However, prior art projectors have disadvantages in that they can be heavy, complex, or dim; can comprise a great number of expensive parts; be too large; generate too much heat; require cooling fans; make too much noise; or have short bulb life. It is therefore desired to have a projection display that overcomes one or more of these disadvantages.

SUMMARY OF THE INVENTION

The present invention includes a solid-state light engine consisting of an illumination subsystem and a projection subsystem.

In an exemplary implementation, the illumination subsystem, illuminates a single liquid crystal on silicon (LCOS) micro-display with light from red, green, and blue light emitting diodes (LEDs). Examples of micro-displays that could be used with the present invention also include FLCOS, HTPS, Texas Instruments DLP, MEMS, and others. The projection subsystem images the LCOS micro-display on to either a reflective or transmissive viewing screen for front or rear-view projection televisions (RPTV). Gray scale and color are created by temporally dithering the LCOS micro-display in conjunction with the LEDs. Other micro-displays can be used to create gray scale in analog fashion as found in a typical LCD. Thus, SXGA resolutions of at least 24-bit color, at least 1280×1024 resolution, and at least 60 Hz frame rate are easily achievable with this system. Although, a projection based TV has been exemplified in the present specification, the present invention may be also be used for computer monitors and other display devices.

One exemplary implementation, includes a doubly telecentric illumination system that diffuses light at the maximum beam spread of the cone of light from the source object points, thereby providing optimum local homogenization of the individual sources at the image. The telecentric illumination system may include a planar array of telecentric light emitting diode (LED) sources telecentrically imaged to the micro-display by at least one Fresnel lens. Light from the individually colored LED channels may be combined through a dichroic cube structure while being imaged to the display. The diffusion mechanism is placed just before the last Fresnel lens where the beam spread is the largest and where the lens serves as the final imaging component of the illumination system.

Additionally, light concentrators such as quad reflective, total internal reflection (TIR) differential, or edge ray concentrators, collectively known as non-imaging concentrators, used in reverse and hence called emitters may be used to collect and subsequently emit light from solid state sources with large areas in the illumination subsystem. The quad differential or edge ray concentrators may include four individually blended concentrators that are integrated side by side, centered on, and covering a quadrant of the solid state source. The shape of the perimeter of the end nearest the solid state source may also be described as a "clover" configuration. This configuration enables an efficient collection and emission optic with a substantially smaller size than a single concentrator covering the entire solid state source.

In one exemplary implementation, a quad TIR compound hyperbolic emitter (CHE) is used to collect and emit light from large LED die sizes and is composed of four individual TIR compound hyperbolic emitters blended side by side to cover the large LED die. Each CHE is centered on and covers a quadrant of the LED die enabling an efficient collection and emission optic much shorter and smaller than a single concentrator.

The output from a non-circular die, or a group of dies, may be more evenly captured and transmitted by orienting each dies corner at the overlap between each of the four CHEs forming the quad TIR CHE such as one having the clover configuration.

Other features and advantages of the present invention will be set forth, in part, in the descriptions which follow and the accompanying drawings, wherein the preferred embodiments of the present invention are described and shown, and in part, will become apparent to those skilled in the art upon examination of the following detailed description taken in conjunction with the accompanying drawings or may be learned by practice of the present invention. The advantages of the present invention may be realized and attained by means of the instrumentalities and combinations particularly pointed out in the appended claims.

Figure 1:
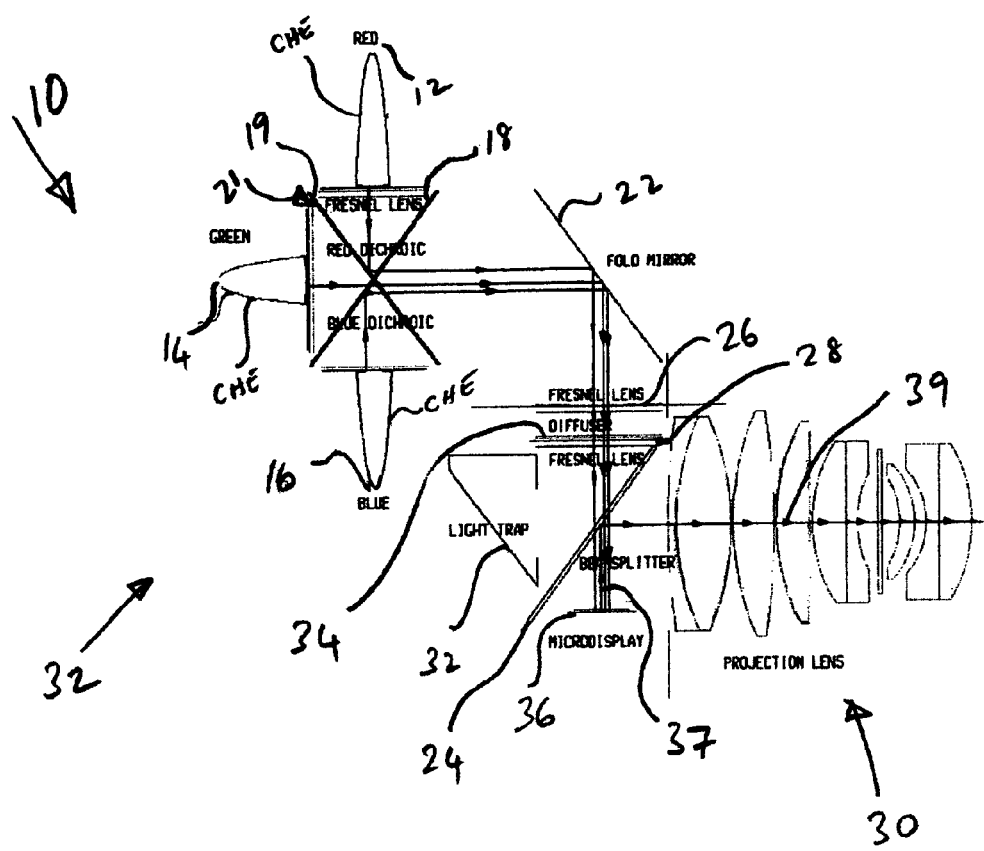
FIG. 1 illustrates the system layout of the optical system according to an exemplary embodiment of the present invention.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DESCRIPTION OF THE EMBODIMENTS

Detailed descriptions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Reference will now be made in detail to that disclosure, which is illustrated in the accompanying drawing (FIGS. 1–18).

As shown in FIG. 1 the optical system 10 of is a solid-state projector consisting of an illumination subsystem 32 and a projection subsystem 30. The illumination subsystem 32 illuminates at least one micro-display 36 with light from a plurality of red 12, green 14, and blue 16 light emitting diodes (LEDs) arranged in separate color groups. The projection subsystem 30 images the output from the LCOS micro-display 36 on to a reflective or possibly transmissive viewing screen for front or rear-view projection television (RPTV). Gray scale and color are created by temporally dithering the LCOS micro-display 36 in conjunction with the LEDs. Thus, SXGA resolutions of at least 24-bit color, at least 1280×1024 resolution, and at least 60 Hz frame rate are easily achievable with this system. The illustration of a television is not a limitation, a display without the capacity to receive a broadcast, cable satellite or other television signal is within the scope of this disclosure. Additionally, those skilled in the art will recognize that organic light emitting diodes (OLEDs), solid state lasers, lasers, and other source of a light within a narrow bandwidth may be used in place of one or more of the LEDs. In addition, the LEDs may be of any color or produce light at any wavelength and/or any band of wavelengths.

The illumination subsystem 32 is a critical or Abbe illumination system that images red, green, and blue (RGB) LED sources, 12, 14, and 16 respectively, to the LCOS micro-display 36 or potentially any other general type of spatial light valve, modulator, or digital light processor. The critical illumination system, attributed to Ernst Carl Abbe's use in microscopy, is an illumination system where the source is imaged directly onto the object. The designed illumination system 32, in addition to being a critical illumination system, may be doubly telecentric. The double telecentricity is an important characteristic that optimizes, in particular, light processing by the LCOS micro-display 36 or other angular dependant micro-displays, while accommodating the telecentric configuration of the LEDs.

Figure 2:
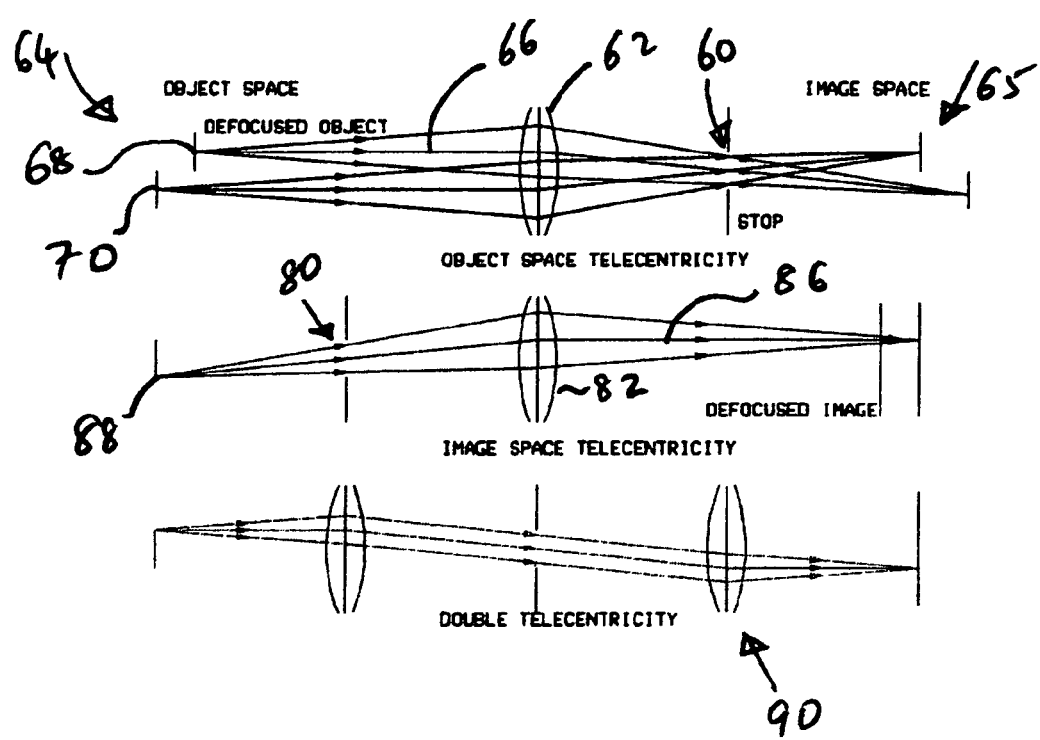
FIG. 2 illustrates the principles of Optical System Telecentricity used in an exemplary embodiment of the present invention.

As will now be explained with reference to FIG. 2, a telecentric optical system is one where the aperture stop 60 is located at a focal point of the optical system causing either the entrance pupil or the exit pupil to be located at infinity. The aperture stop 60 is the physical stop that limits the amount of light or cone of light that propagates through the optical system. The entrance pupil is the image of the aperture stop formed by all active optical elements preceding the aperture stop 60. The exit pupil is the image of the aperture stop formed by all active optical elements following the aperture stop.

An optical system exhibiting object-space telecentricity has its aperture stop 60 located at the rear focal point of the optical system or lens 62. The entrance pupil is therefore at infinity in the object space 64 (a space so called because it is where the object is normally located). An incident chief ray 66 propagating from an object point 68 parallel to the optical axis will travel through the center of the aperture stop 60 to the image plane 65. The chief ray 66, by definition, is the ray from an object point 68 that propagates through the center of the aperture stop 60 and hence the entrance and exit pupils since they are images of the aperture stop. A chief ray 66 from another object point 70 will propagate in a substantially similar manner. In the case of object space telecentricity, if the object points are shifted, the resulting image point magnifications do not change and the points are only blurred in the image plane.

Similarly, an optical system exhibiting image-space telecentricity has its aperture stop 80 located at the front focal point of the optical system or lens 82. The exit pupil is therefore at infinity in a space where the image is normally located. An incident chief ray 86 propagating from an object point 88 will travel through the center of the aperture stop 80 exiting parallel to the optical axis at the image plane 83. A chief ray from another object point will propagate in a substantially similar manner. In the case of image space telecentricity, if the image plane is now shifted, the resulting image points magnification do not change and the points are only blurred in the image plane. Finally, a doubly telecentric system 90 combines the advantages of the object space telecentricity and image space telecentricity, and as illustrated in FIG. 2.

The micro-display 36, in one aspect, uses ferro-electric liquid crystal technology to switch the state of polarization of the incident light 37 in the plane of the cell. However, the effectiveness of the micro-display's polarization retardation and associated state switching is a function of the path length of the light in the ferro-electric material. In other words, the micro-display 36 operates best when light is normally incident on its active plane and all the rays of light travel nearly the same optical path length in the ferro-electric material. This is generally true of all liquid crystal based micro-displays. For example, although the micro-display 36 (such as an LCOS micro-display) can accept up to a 25 degree off axis beam (f/1.2), it performs best and produces best contrast at f/3 or approximately a 10-degree maximum incident angle. The f/number is an indication of the light gathering capabilities of an optical system. Optical systems with smaller f/numbers collect more light than large f/number systems. The image space f/number is defined as the ratio of the effective focal length of the optical system divided by the entrance pupil diameter. However, in a typical illumination system it is not uncommon to have f-numbers very close to f/1 in order to maximize the amount of light illuminating the object. The chief ray at the edge of the source in a non-telecentric system enters the micro-display 36 at a large angle and will be switched significantly differently than an on-axis ray from the center of the source. Thus, it is generally of interest to send light into the LCOS micro-display 36, or any similarly behaving micro-display 36, at near normal incidence from all points of the source. An illumination subsystem 32 that provides image-space telecentricity at the LCOS micro-display 36 or any similar type of micro-display 36 forces the chief ray from each LED (12, 14, 16) to illuminate the micro-display 36 perpendicular to its plane. The chief ray in this case is the ray of light from object points on each end of the sources that propagates through the center of the aperture stop.

Thus, light is incident across the micro-display 36 aperture more uniformly resulting in a more uniform distribution of light that is output from the micro-display to the projection screen. However, although the bundle of light around the chief ray may experience slightly longer path lengths, through the micro-display material, the majority of light from a particular source point will be much closer to optimum conditions than that from a non-telecentric system operating at a similar f-number.

LEDs (12, 14, 16), typically, are arranged on an electrical board with their emission axis perpendicular to the board. Such a light emitting source is considered a telecentric source, thereby suggesting the use of a telecentric optical system for imaging purposes. In this situation, the optical system will have an object-space telecentricity. Thus, an illumination subsystem that provides object-space telecentricity, at the LEDs, forces the chief ray from each LED to emit parallel to the optical axis of the LED. In other words, a ray emitting from the center of the LED parallel to the optical axis is forced to be the chief ray.

Figure 3:
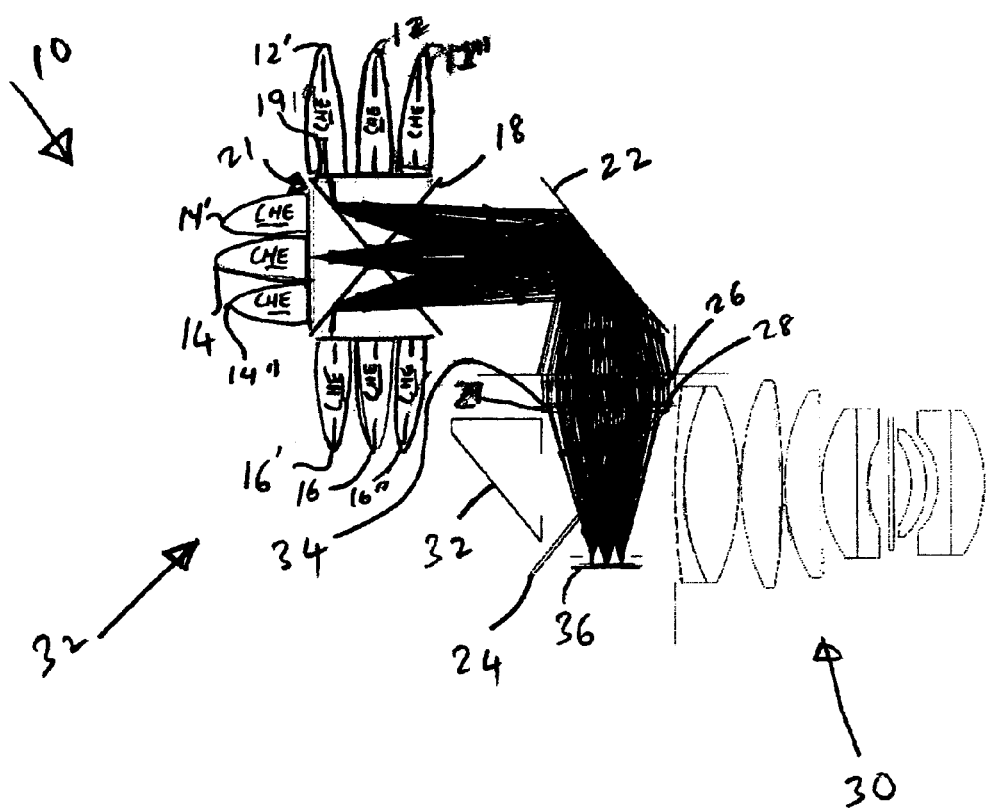
FIG. 3 illustrates the light path propagation of the optical system of FIG. 1 using the principles of double telecentricity.

The present invention, in an exemplary aspect, utilizes both object and image space telecentricities to accommodate the requirements of the micro-display and inherent LED layout on the electrical board. FIG. 3 illustrates the doubly telecentric operation of the projector and the path propagation of the light rays emitted from the LEDs (12', 14, 16'). The illumination system may include glass, plastic, aspheric, or Fresnel condenser lenses (20, 26, 28) to image the sources to the micro-display 36. The current system uses, in an exemplary nature, three Fresnel lenses (20, 26, 28), whose Fresnel side is adjusted to minimize illumination system aberrations. Standard glass lenses, in addition or in lieu of Fresnel lenses, could also be used. However, it is easier to manufacture larger aperture, lower f/number Fresnel lenses than equivalent glass ones. Furthermore, the Fresnel lenses are easily aspherized to correct for spherical aberration, and are thin, lightweight, and less expensive than glass condenser lenses.

The illumination subsystem 32 includes a solid state source of red, green, and blue LEDs (12, 14, 16). In one implementation, an array of each color of red and green and blue LEDs are used as sources. The LEDs are arranged in an array on the electrical board. Another implementation, described in detail below, uses LEDs of each color arranged, for example, in an hexagonal packed array. The arrays are composed of red and green and blue LEDs. Alternatively, any LED having a selected waveband and output power may be used. The red LED die may be enclosed with an appropriate encapsulent material within the hemispherical dome of the collection optic. The green and blue LED die also could be enclosed with an appropriate encapsulent material within a similar hemispherical dome. The green and blue LEDs could be four die arranged in a 2×2 die matrix. These LED may also have their die enclosed in an appropriate encapsulent material within a similar domical cavity. The encapsulent is necessary to provide an index matching material between the die emission surface and the collection optic with used in total internal reflection.

All of the LEDs in the array emit with a hemispherical Lambertian emission pattern. A Lambertian emission pattern emits with equal brightness in all directions around the hemisphere while exhibiting a cosine fall off in intensity as a function of angle from the normal of the emission surface.

However, a fundamental problem of using such LEDs is capturing the available light from the LEDs and concentrating it into an area and emission angle that can efficiently and physically be imaged by the critical illumination system to the micro-display 36. The hemispherical dome lenses are substantially large and limit the collection and ultimately the concentration of the light from the LEDs (12, 14, 16) on the micro-display 36. The theoretical thermo-dynamic limit of light concentration, called the conservation of brightness or throughput or etendue, is the product of the emission area of the source and its emission solid angle and is conserved as light propagates through the optical system. Small area sources with large emission solid angles cannot be forced, for example, into narrow emission solid angles with the same emission area.

Thus, compound hyperbolic concentrators (CHCs) can be used to optimize the collection efficiency of light off of the LEDs, which may be in the form of a planar surface. Compound hyperbolic concentrators and their more common relative, compound parabolic concentrators (CPCs) were originally developed as solar concentrator technologies concentrating solar energy to a detector. When used in reverse (i.e., LED replacing the detector), they become highly efficient illuminators or emitters. As such they will be referred to hereafter as compound hyperbolic emitters (CHEs). The CHEs, in one implementation, are designed to achieve optimal total internal reflection (TIR), thereby maximizing the light collection efficiency from the LED die and subsequently maximizing the emission efficiency of the combined die and CHE system. The CHEs fit over the actual LED die, but with the hemispherical lens removed from the original LED package. The surface of the CHE is inherently designed to reflect light by total internal reflection. The cavity at the bottom of the CHE was filled with an index-matched encapsulent, which coupled light from the die directly to the CHE.

In one implementation, the red, green, and blue CHEs were different from the green and blue CHEs. This was due to the difference in size of the die. Furthermore, some CHEs are truncated in length to limit their output apertures to accommodate magnifying their output to the micro-display. The non-truncated output aperture size is directly related to the input aperture size through the following equation.

$$CHE \text{ Output Radius} = \frac{CHE \text{ Refractive Index} \times CHE \text{ Input Radius}}{\text{Sin}(CHE \text{ Angle})}$$

The truncation only limits the theoretical emission efficiency to about 90%. This number has been verified empirically. As can be seen from FIG. 4, these CHEs are symmetric in shape.

A quad CHE has bilateral symmetry as shown in FIG. 5A–5D. Such CHEs are generally a "quad" CHE composed of four separate CHEs. Additionally, some green and blue die are twice as large as the red die and in fact are made of four individual die.

Positioning a single CHE over the larger arrays of four individual die produces an excessively large CHE output size that is ultimately inconsistent with that required to image light from the CHEs to the micro-display 36. The quad CHE can reduce the CHE output size while still maintaining reasonable emission efficiency. Furthermore, the quad CHE consists of four individual CHEs, each CHE is centered on the corner "CC" of each of the four dies 119a–119d LEDs to completely cover all the LEDs. Finally, the surfaces of adjacent CHEs trim each other along planes centered on the quad CHE. These devices must also be truncated and the truncation and trimming limits the theoretical emission efficiency to 65%, which also has been verified empirically.

As can be seen from FIG. 5A–5D, in an exemplary implementation one end 110 of the quad CHE includes circular overlapping surface ends 116 from each of the individual CHE ($CHE_1$, $CHE_2$, $CHE_3$ and $CHE_4$) ends 116a–116d. This approach ensures complete coverage of the dies 119a–119d with the four by four arrays. Of course, this design may be adapted to cover arbitrary number of solid state light sources of arbitrary shape, output power, and wavelengths. In this aspect of the invention, the overlapping surfaces (or apertures) at the end 110 may be of arbitrary shape (e.g., square, triangular, etc.) and arbitrary size to ensure complete coverage of an arbitrary shaped dies having the LEDs.

Figure 4A:
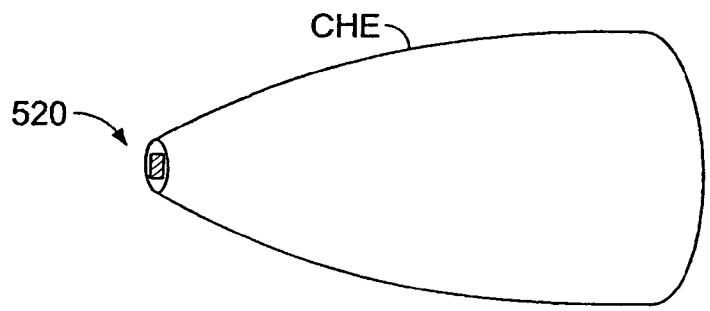
FIGS. 4A and 4B illustrates the Red Compound Hyperbolic Emitter (CHE) used in an exemplary implementation of the present invention.
Figure 4B:
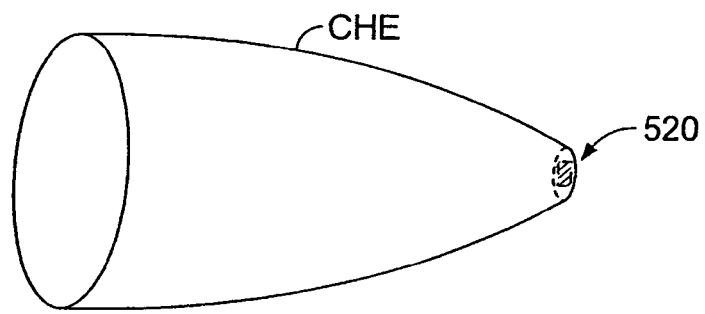
Figure 4C:
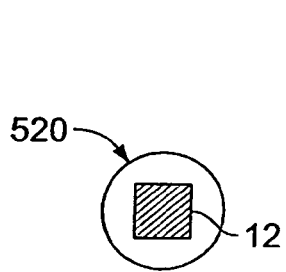
FIG. 4C illustrates the placement of the end surface of a compound hyperbolic emitter to fit over the LED die for maximizing the collection and transmission efficiency.
Figure 4D:
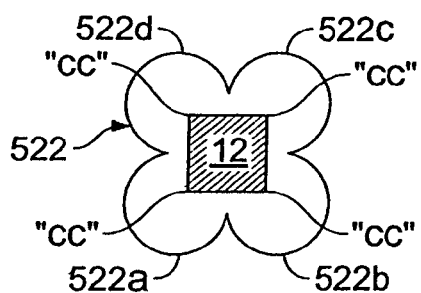
FIG. 4D illustrates the placement of the end surface of a single quad hyperbolic emitter to fit over an LED die for maximizing the collection and transmission efficiency.
Figure 5A:
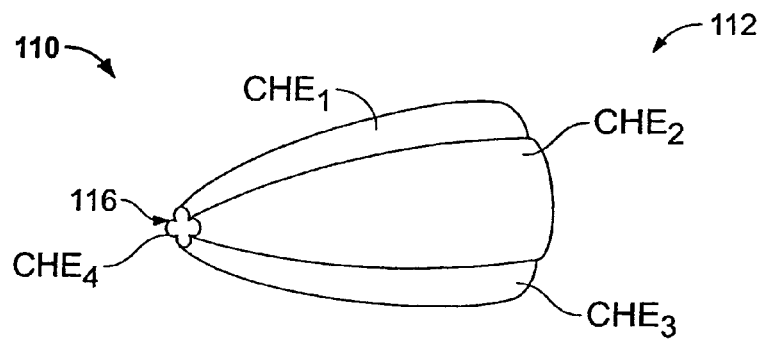
FIGS. 5A and 5B illustrates the Green/Blue Quad Compound Hyperbolic Emitter (CHE) used in an exemplary implementation of the present invention.
Figure 5B:
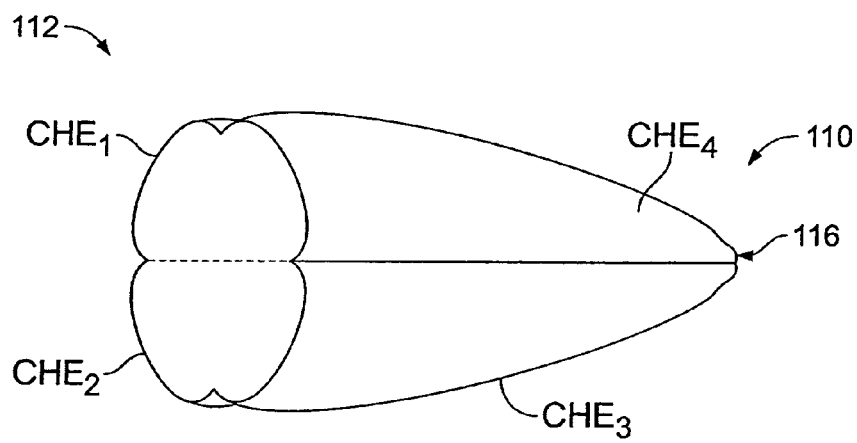
Figure 5C:
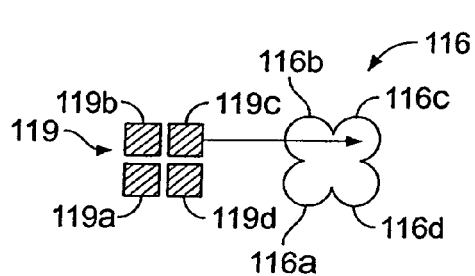
FIG. 5C illustrates the placement of the end surface of a quad compound hyperbolic emitter to fit over multiple LED dies for maximizing the collection and transmission efficiency.
Figure 5D:
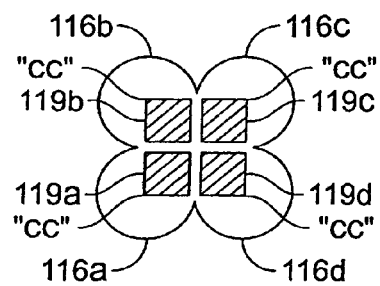
FIG. 5D illustrates the orientation of multiple LED dies at the end surface of a quad compound hyperbolic emitter shown in FIG. 5C.

Thus, a single CHE, possibly with a clover configuration as shown in FIGS. 5C and 5D, (or a triangular, square, circular, or any arbitrary polygonal shape) could be oriented with the die in a manner to maximize collection efficiency of the CHE and thus maximize emission efficiency of the combined die and CHE system. Specifically, as can be seen in FIG. 4C, the end 520 of the CHE may be oriented over the die to completely encompass the LED die 12. The end 522 of a single CHE with a quad or clover configuration is shown in FIG. 4D. The corners "CC" of the die 12 are substantially oriented in the center of each lobe 522a–522d.

In another aspect of the invention, multiple CHE's may be combined to yield a configuration of end surfaces having an arbitrary configuration, instead of the clover configuration (e.g., pentagonal, hexagonal, etc.), and the periphery of the back end surfaces of the CHE's may be oriented about the corners/edges of the die to maximize collection efficiency of the CHE's and thus maximize emission efficiency of the combined die and CHE system. An example of the clover configuration formed from the quad CHE is shown in FIG. 5C encompassing the dies comprising, for example, blue and green LEDs.

Light from the red, green, and blue (RGB) LEDs (12, 14, 16) has to be recombined before it is processed by the micro-display 36 in the present system 10. Color cubes and dichroic filters may be used for color recombination and splitting and in tri-color liquid crystal display (LCD) projection systems.

The color cube, sometimes called an "X-cube", is essentially a dichroic beamsplitter composed of four glass prisms coated with special coatings along the prism sides but not necessarily along the prism's hypotenuse. When the prisms are glued together their sides form the coated diagonals of the cube and hence the name X-cube. An X-cube is typically located very close to the LCD and hence is required to be of a high optical quality. However, major drawbacks of a color cubes include cost, size, and weight.

Dichroic filters are generally used to split light from a polychromatic (white) source, typically a discharge lamp, into component red, green, and blue (RGB) colors, and are typically located at the source side of the illumination system. The separate colors, after processing, are then recombined by the color cube. However, the major draw back to dichroic filters is their poorer optical quality as compared to color cubes and the fact that they split two colors and not three at a time.

Figure 6:
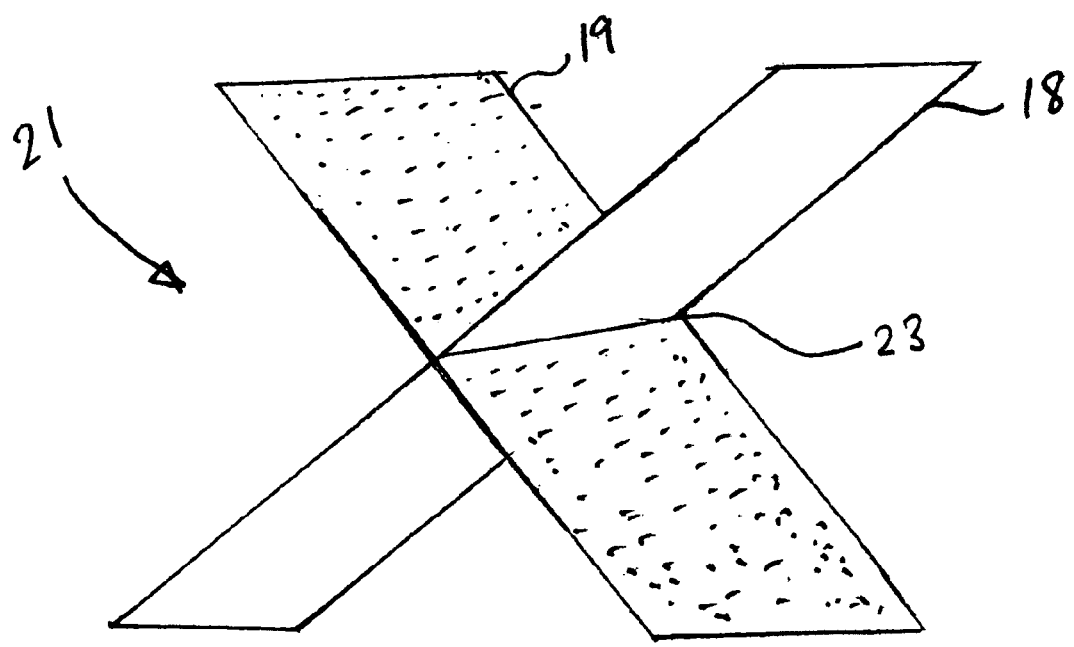
FIG. 6 illustrates a Dichroic structure comprising thin glass plates with dichroic material used in an exemplary implementation of the present invention.

A dichroic X (DX) structure, as shown in FIGS. 1, 3, or as illustrated in detail in FIG. 6 is designed, in an exemplary aspect of the present invention, to recombine the RGB LED light outputs before it is processed by the micro-display 36. The DX structure 21 is constructed by cutting either a red dichroic filter 19 or a blue dichroic filter 18, or gradient dichroic filters, in half. Gradient dichroic filters may be used instead of uniform dichroic filters to compensate for undesired color shifts caused by reflection and transmission variations as a function input beam angle of incidence on the dichroic filter. The end of each half is then secured to the middle of the other filter, forming another "X" but with thin, glass plate dichroic filters. The dichroic filters are not required to be of high optical quality since they are located in the illumination end of the present system 10, and not in the image path. The obscuration created by the joint between the halves is substantially small and, furthermore, is not in a conjugate plane to the micro-display 36. This and a homogenization component within the optical system mitigate any non-uniformity created by the seam 23.

A fold mirror 22 is included in one embodiment of the illumination system to fold the optical path to make a substantially compact system. The front surface of the fold mirror 22 may be enhanced with an aluminum coating to minimize reflective loss.

A diffuser 34 is placed just before the third Fresnel condenser lens. The diffuser homogenizes or makes uniform any non-uniformity from the RGB LED sources. The particular diffuser used, for example, in this design is a Light Shaping Diffuser (LSD). Plastic or ground glass diffusers could be used as well, the choice of diffuser is dependant on the use and other parameters of a system.

The diffuser's position in the optical system optimizes homogenization of the light reaching the micro-display 36. Placing the diffuser at the source ends near the CHEs, for example, which is a conjugate position of the critical illumination system, does not provide for the best light uniformity output. A position closest to the final optical element where the beam size (or beam spread) is at a maximum, on the object space side of the element, provides optimum homogenization in this particular design. Diffusing light from the individual LEDs at their maximum spread in the optical system provides optimum local homogenization of the light output from the LEDs at the micro-display 36.

Figure 7:
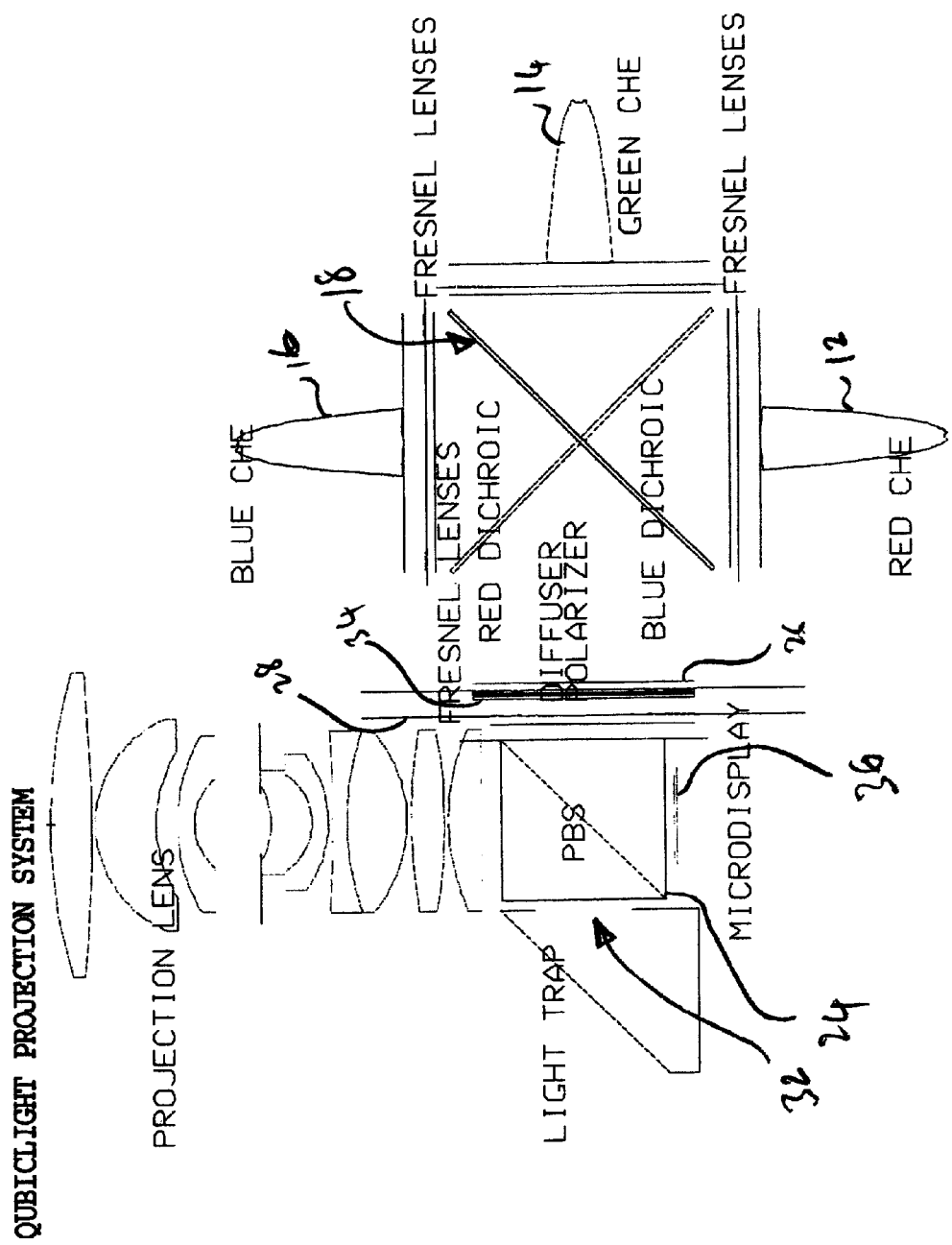
FIG. 7 illustrates the system layout of the optical system according to another exemplary implementation of the present invention.

In another implementation, the fold mirrors may be eliminated, as shown in FIG. 7, to minimize optical losses by appropriately positioning the CHE-LED combination, the DX structure 21, the Fresnel lenses 26, 28, and the diffuser 34, in relation to the polarization beam splitter 24 and micro-display 36.

Light from the RGB LED sources is non-polarized or natural polarized. However, light incident on the LCOS micro-display must be linearly polarized. Furthermore, the micro-display may be a reflective and not a transmissive device. Hence, a polarization component 24 is (i) used to linearly polarize the light entering the micro-display and (ii) reflect the orthogonally polarized component from the micro-display onto the projection lens. Alternatively, the system may be designed such that the LEDs emit polarized light. In this case, the polarizing beam splitter may be replaced with a regular beam splitter.

In one implementation the polarizing beam splitter 24 may be a wire grid (for e.g., the polarizing beam splitter 24 could be the beam splitter manufactured by Moxtek). The polarizing beam splitter 24 serves simultaneously as polarizer as well as a beam splitter. The wire grid type polarizer is thin, lightweight, relatively inexpensive, and does not introduce a significant, additional glass thickness into the illumination or the projection optical path. Furthermore, wire grid polarizers generally accept smaller f/number beams (larger or wider acceptance angles), have high extinction ratios, and higher transmission and reflection of linearly polarized light than the typical polarization beam splitters.

In an another implementation, other types of polarizers could be used, such as a cube beam splitters with a polarization coating optimized for faster optical systems. Alternatively, there could also be a wire grid or other type of polarizer to pre-polarize the light incident on a polarization beamsplitter.

The micro-display 36 in one aspect may be an SXGA color reflection mode Liquid Crystal Display (LCD) capable of displaying full color computer or video graphics with a substantially high spatial resolution . The liquid crystal on silicon (LCOS) device uses a ferroelectric, as opposed to twisted neumatic, structure to switch the state of incident polarization very rapidly. Gray scale and color are achieved by temporally dithering the LCOS micro-display in conjunction with the LEDs. Other types of micro-displays could be used in the current embodiment. For example, any single-chip technology such as Texas Instruments DLP may be used for at least one micro-display. Alternatively, the microdisplay(s) could be either LCOS, FLCOS, HTPS, or MEMS based, The light trap 32 is a light trapping box designed to suppress the orthogonally polarized non-signal light reflected from the polarizing beam splitter 24. This light, if not suppressed, will contribute to significant contrast reduction if it is reflected or scattered back into the signal beam path 39.

The light trap 32 is composed of an anti-reflection (AR) coated black-glass and a highly absorptive black wall. The AR coated black glass is oriented at 45 degrees with respect to the incident light. Most of the light is transmitted visible light that enters the AR coated black glass and is highly absorbed as it propagates through the absorptive material. The small portion of remaining reflected visible light propagates to the highly absorptive black painted wall. Any back scattered light is scattered to the AR coated black-glass where the majority of this small amount of light further absorbed by the absorptive glass. The trap cavity and associated aperture is designed to block a direct stray light path back to the microdisplay and the imaging path. Many orders of magnitude in stray light reduction are achievable with this arrangement. Additional folds can be added to further suppress any back-scattered component.

The projection lens 30 images the micro-display output on to the viewing screen. The projection lens 30, in one aspect of an implementation , could be a nine element in six group, f/1.75 lens, and is designed to project approximately 40-inch diagonal image at a distance of around 8 feet. The projection lens may also contain a wire-grid linear polarizer at the aperture stop position. The polarizer in the projection lens would be needed to improve the contrast ratio of the signal after refection from the wire-grid beamsplitter. The contrast ratio off of this component is typically only about 20:1–50:1. The linear polarizer in this particular design is placed at the stop because this space occupies a minimum area and the angles of incidence of the light are a minimum. The linear polarizer may also be rotated independently of the lens barrel to accommodate contrast ratio changes as the lens is rotated to change focus.

Figure 8:
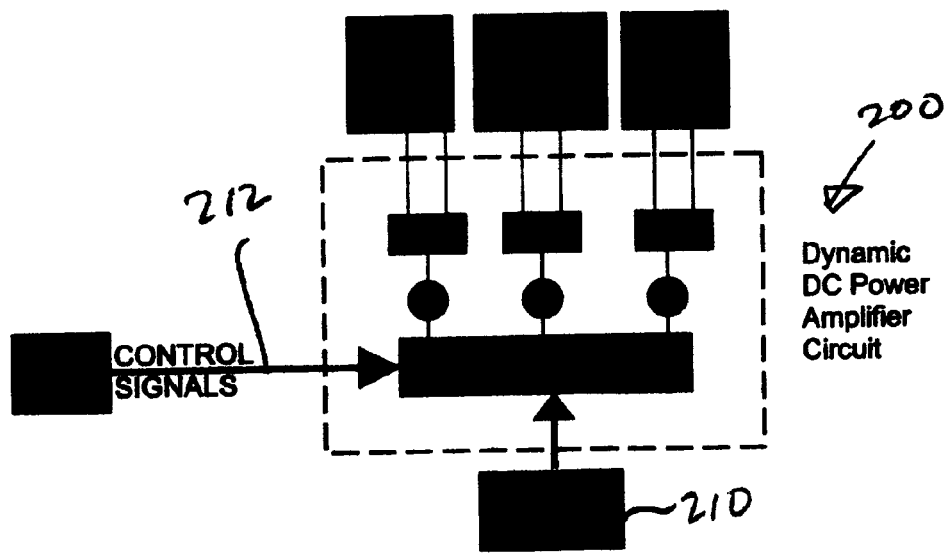
FIG. 8 is an exemplary implementation of the electronics for controlling the LED light output.

Furthermore, the system employs a dynamic DC power amplifying circuit 200 that provides specific current to individual LED (solid state light sources) color channels at specific time intervals as shown in FIG. 8. Inputs to the circuit are DC power 210 and a control signal 212 per LED color channel. The circuit board 200 amplifies the DC power to preset current limits per LED color channel, and can be controlled either digitally or manually, and as active control signals are received the amplified DC power is supplied to the corresponding LED color channel resulting in LED light output for that specific channel. The result is actual LED light output that can be controlled digitally, and timed LED light output that can be color sequential to a corresponding frame on a micro-display. This is done very differently from traditional lamp designs where AC power is being supplied to the lamp resulting in light that is outputed at a constant frequency.

Figure 9:
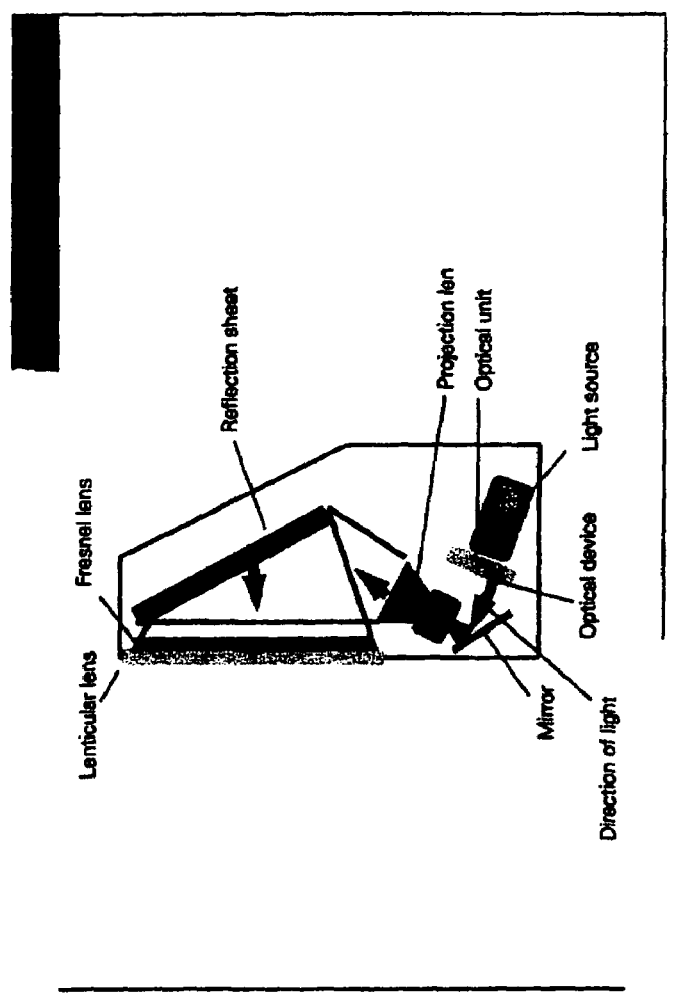
FIG. 9 is an exemplary structure of a rear projection television.

The general layout of a rear projection television, or other visual display, which includes one of the application areas, for the present invention is shown in FIG. 9.

It is to be understood that other embodiments may be utilized and structural and functional changes may be made without departing from the respective scope of the present invention. Possible modifications to the system include, but are not limited to, smaller or larger die size for the LED's thereby permitting a non-quad CHE to be placed in conjunction with said LEDs, a signal processing means for filtering the signal to the micro-display for improving the uniformity of the light signal and for improving the signal-noise-ratio.

We claim:

1. A non-imaging device for increasing a collection efficiency of light received from an at least four solid state sources of light and subsequently emitting light towards a micro-display in an optical system for image projection, the non-imaging device comprising at least a quad total internal reflection based compound hyperbolic emitter integrally mounted on a die having at least one solid state device.

2. The non-imaging device of claim 1, wherein the at least four solid state sources of light are at least one of a red, blue or a green light emitting diode.

3. A non-imaging device for increasing a collection efficiency of light received from at least one solid state source of light subsequently emitting light towards a micro display in an optical system for image projection, the non-imaging device comprising a total internal reflection based compound hyperbolic emitter integrally mounted on a die having a least one solid state device; and wherein a cavity in the compound hyperbolic emitter includes an index matched encapsulent for substantially coupling light emitted from the at least one solid state source of light with the compound hyperbolic emitter.

4. A non-imaging device for increasing an emission efficiency of light received from an at least one solid state source of light, in an optical system for image projection, the non-imaging device including a quad total internal reflection based compound hyperbolic emitter integrally mounted on a plurality of dies, wherein each die in the plurality of dies includes the at least one solid state source of light.

5. The non-imaging device of claim 4, wherein the quad total internal reflection based compound hyperbolic emitter includes a plurality of individual total internal reflection based compound hyperbolic emitters designed to cover the plurality of dies or die areas or parts thereof.

6. The non-imaging device of claim 5, wherein each of the individual total internal reflection based compound hyperbolic emitters are substantially aligned with a corner of each of the plurality of dies to completely cover the plurality of dies.

7. The non-imaging device of claim 4, wherein at least one solid state source of light is a light emitting diode.

8. The non-imaging device of claim 4, wherein a cavity in each of the individual compound hyperbolic emitter includes an index matched encapsulent for substantially coupling light emitted from at least one solid state source of light with the individual compound hyperbolic emitter.

9. A device for combining a plurality of signals transmitted from at least two different arrays of at least one light emitting diodes of a substantially different color to a means for modulating image signals onto said plurality of signals in an optical system for image projection, the device comprising a structure formed from a plurality of dichroic or graduated dichroic filters provided before said means for modulating and after said arrays of light emitting diodes in said optical system and wherein an angle of orientation of each of said plurality of dichroic or graduated dichroic filters is different.

10. The device of claims 9, wherein the plurality of dichroic or graduated dichroic filters include at least one of a red dichroic filter and one of a blue dichroic filter.

11. A device for providing uniformity of a beam of light at a micro-display, in an optical system for image projection including a plurality of optical elements provided in an optical path of said optical system before micro-display, the device including a diffuser positioned substantially away from a source of said beam of light and among said plurality of optical elements adjacent to at least one of said plurality of optical elements in said optical system.

12. The device of claim 11, wherein the diffuser is positioned at a point in space, in the optical system for image projection, where the spread of a beam of light is substantially at a maximum, and wherein the beam of light is formed by combining light originating from an array of solid state sources of light of at least two different colors.

13. An optical system for use in projection displays, the system comprising: an array of solid state light sources, wherein each of the solid state light sources in the array being associated with a non-imaging device for increasing an emission efficiency of light output from the array of solid state light sources; a dichroic filter based device for combining a plurality of signals transmitted from an array of at least one solid state light source and formed from a plurality of dichroic filters; a microdisplay for illumination with light output from the array of solid state light sources; a diffuser for homogenization of light at the microdisplay, wherein the diffuser is positioned at a point in space, in the optical system, where the spread of a beam of light transmitted from the dichroic filter based device is substantially at a maximum.

14. The optical system of claim 13 wherein the non-imaging device is a total internal reflection based compound hyperbolic emitter.

15. The optical system of claim 13 wherein the array of solid state light sources includes red, blue and green light emitting diodes.

16. The optical system of claim 15 wherein the non-imaging device is a total internal reflection based compound hyperbolic emitter associated with a light emitting diode.

17. The optical system of claim 15 wherein the non-imaging device is a quad total internal reflection based compound hyperbolic emitter associated with an array of light emitting diodes.

18. The optical system of claim 17 wherein the aperture of the quad compound hyperbolic emitter is circular.

19. The optical system of claim 17 wherein the aperture of the quad compound hyperbolic emitter is triangular or another polygonal shape.

20. The optical system of claim 13 further including a plurality of Fresnel lenses.

21. The optical system of claim 13 further including a polarizing beam splitter for linearly polarizing light delivered to the microdisplay.

22. The optical system of claim 21 further including a light trap for suppressing orthogonally polarized non-signal light reflected from the polarizing beam splitter.

* * * * *